(12) United States Patent
Ottikkutti et al.

(10) Patent No.: US 9,822,727 B2
(45) Date of Patent: Nov. 21, 2017

(54) METHOD AND SYSTEMS FOR ADJUSTING ENGINE CYLINDER OPERATION BASED ON A KNOCK SENSOR OUTPUT

(71) Applicant: General Electric Company, Schenectady, NY (US)

(72) Inventors: Pradheepram Ottikkutti, Lawrence Park, PA (US); Prashant Srinivasan, Bangalore (IN); Sachin Shivajirao Kulkarni, Bangalore (IN)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 14/926,969

(22) Filed: Oct. 29, 2015

(65) Prior Publication Data

US 2017/0122246 A1 May 4, 2017

(51) Int. Cl.
| | |
|---|---|
| *F02D 41/00* | (2006.01) |
| *F02D 41/40* | (2006.01) |
| *F02D 35/02* | (2006.01) |
| *F02D 41/26* | (2006.01) |

(52) U.S. Cl.
CPC ......... *F02D 41/402* (2013.01); *F02D 35/023* (2013.01); *F02D 35/027* (2013.01); *F02D 35/028* (2013.01); *F02D 41/0025* (2013.01); *F02D 41/0027* (2013.01); *F02D 41/263* (2013.01); *F02D 41/401* (2013.01)

(58) Field of Classification Search
CPC ............... F02D 41/402; F02D 41/0027; F02D 41/0025; F02D 41/401; F02D 41/263; F02D 35/028; F02D 35/023; F02D 35/027

See application file for complete search history.

(56) References Cited

U.S. PATENT DOCUMENTS

| 2,767,691 A | * | 10/1956 | Mengelkamp | F02B 7/00 123/1 A |
| 2,909,159 A | * | 10/1959 | Britton | C10L 1/08 123/1 A |
| 2,977,942 A | * | 4/1961 | Reynolds | F02B 3/06 123/301 |
| 3,202,141 A | * | 8/1965 | Lovell | F02B 11/02 123/1 R |
| 3,312,102 A | * | 4/1967 | Traver | G01N 25/50 73/35.02 |

(Continued)

FOREIGN PATENT DOCUMENTS

WO 2009144374 A1 12/2009

*Primary Examiner* — Hieu T Vo
*Assistant Examiner* — Sherman Manley
(74) *Attorney, Agent, or Firm* — Global Patent Operation; John A. Kramer

(57) ABSTRACT

Various methods and systems are provided for individually adjusting fueling to cylinders of an engine based on an output of a knock sensor coupled to each cylinder. In one embodiment, a method for a multi fuel engine comprises individually adjusting, for each cylinder of the engine, one or more of a gas flow rate of gaseous fuel, a diesel flow rate of diesel fuel, an injection or induction timing of gaseous fuel, or an injection timing of diesel fuel based on each of an output of an individual knock sensor for each cylinder, a knock threshold for current engine operating conditions, and a reference value of individual cylinder output.

20 Claims, 6 Drawing Sheets

(56) References Cited

U.S. PATENT DOCUMENTS

| | | | | |
|---|---|---|---|---|
| 4,881,401 A | * | 11/1989 | Cockerham | G01L 23/225 |
| | | | | 73/35.03 |
| 5,875,743 A | * | 3/1999 | Dickey | F02B 1/12 |
| | | | | 123/25 C |
| 5,887,566 A | * | 3/1999 | Glauber | F02D 19/105 |
| | | | | 123/27 GE |
| 6,240,900 B1 | * | 6/2001 | Thomas | F02P 5/1522 |
| | | | | 123/406.21 |
| 7,019,626 B1 | * | 3/2006 | Funk | F02D 19/0647 |
| | | | | 123/205 |
| 7,957,889 B2 | | 6/2011 | Portin et al. | |
| 2002/0007816 A1 | * | 1/2002 | Zur Loye | F02B 1/12 |
| | | | | 123/295 |
| 2004/0103714 A1 | * | 6/2004 | Fukuoka | G01L 23/225 |
| | | | | 73/35.04 |
| 2004/0139943 A1 | * | 7/2004 | Kern | F01P 11/16 |
| | | | | 123/198 D |
| 2004/0173180 A1 | * | 9/2004 | Strom | F02B 1/12 |
| | | | | 123/299 |
| 2008/0051981 A1 | * | 2/2008 | Naber | G01L 23/225 |
| | | | | 701/111 |
| 2011/0088654 A1 | * | 4/2011 | Courtoy | F02D 19/0647 |
| | | | | 123/299 |
| 2013/0179050 A1 | * | 7/2013 | Munshi | F02B 43/10 |
| | | | | 701/104 |
| 2013/0255628 A1 | * | 10/2013 | Moren | F02B 69/04 |
| | | | | 123/406.29 |
| 2016/0169132 A1 | * | 6/2016 | Yeager | F02D 41/0027 |
| | | | | 701/103 |
| 2017/0089278 A1 | * | 3/2017 | Tulapurkar | F02D 41/0027 |

* cited by examiner

METHOD AND SYSTEMS FOR ADJUSTING ENGINE CYLINDER OPERATION BASED ON A KNOCK SENSOR OUTPUT

BACKGROUND

Technical Field

Embodiments of the subject matter disclosed herein relate to cylinders of an engine and adjusting operation of the cylinders based on a knock sensor output.

Discussion of Art

A multi-cylinder engine includes a plurality of individual cylinders. Each cylinder combusts air and fuel to power the engine. Over time, individual cylinders and/or components coupled to the individual cylinders (e.g., exhaust valves) may become degraded. Further, since fueling may be individually controlled for each cylinder, fueling may become uneven between all the cylinders of the engine. If individual cylinders are not being fueled accurately (e.g., amount or timing of fuel injection), or cylinders become degraded, engine misfire may occur and/or the efficiency of the engine may decrease. Further, if the output of the cylinders varies such that the cylinders are unbalanced, this may put stress on engine components, such as the crankshaft, bearings, and/or cylinder connecting rods. While some engines may utilize individual cylinder pressure sensors for measuring in-cylinder pressure for cylinder balancing purposes, this may increase engine component costs, increase control complexity, and increase unreliability of in-cylinder pressure sensors exposed to high combustion gas pressures and temperatures.

BRIEF DESCRIPTION

In one embodiment, a method for a multi fuel engine (e.g., a method for controlling a multi fuel engine system) comprises individually adjusting, for each cylinder of the engine, one or more of a gas flow rate of gaseous fuel, a diesel flow rate of diesel fuel, an injection timing of diesel fuel, and/or an induction or injection timing of gaseous fuel based on each of an output of an individual knock sensor for each cylinder, a knock threshold for current engine operating conditions, and a reference value of individual cylinder output.

DETAILED DESCRIPTION

The following description relates to embodiments of individually adjusting fueling to cylinders of an engine based on outputs of knock sensors coupled to each cylinder. As one embodiment, a method for a multi fuel engine includes individually adjusting, for each cylinder of the engine, one or more of a gas flow of gaseous fuel, a diesel flow of diesel fuel, an injection timing of diesel fuel, and/or an induction or injection timing of gaseous fuel based on each of an output of an individual knock sensor for each cylinder, a knock threshold for current engine operating conditions, and an individual cylinder reference value. As such, a controller may employ one or more actuators to adjust operation of a fuel injector and/or a fuel flow valve to individually adjust the fueling to the cylinders. In one example, the individual cylinder reference value may be a mean peak cylinder pressure for all cylinders of the engine or peak cylinder pressure for each individual cylinder in an engine model, where the engine model is based on a standard, non-degraded engine. In another embodiment, the method may be carried out in a single fuel engine and the method may include individually adjusting, for each cylinder of the single fuel engine, one or more of a flow of fuel and/or an injection or induction timing of the fuel based on each of an output of an individual knock sensor for each cylinder, a knock threshold for current engine operating conditions, and an individual cylinder reference value. In another example, the method carried out in the single fuel engine may include individually adjusting, for each cylinder of the single fuel engine, an ignition timing (e.g, of a spark plug coupled to the individual cylinder) and/or an injection timing of the single fuel based on each of the output of the individual knock sensor for each cylinder, the knock threshold for current engine operating conditions, and the individual cylinder reference value.

Figure 1:
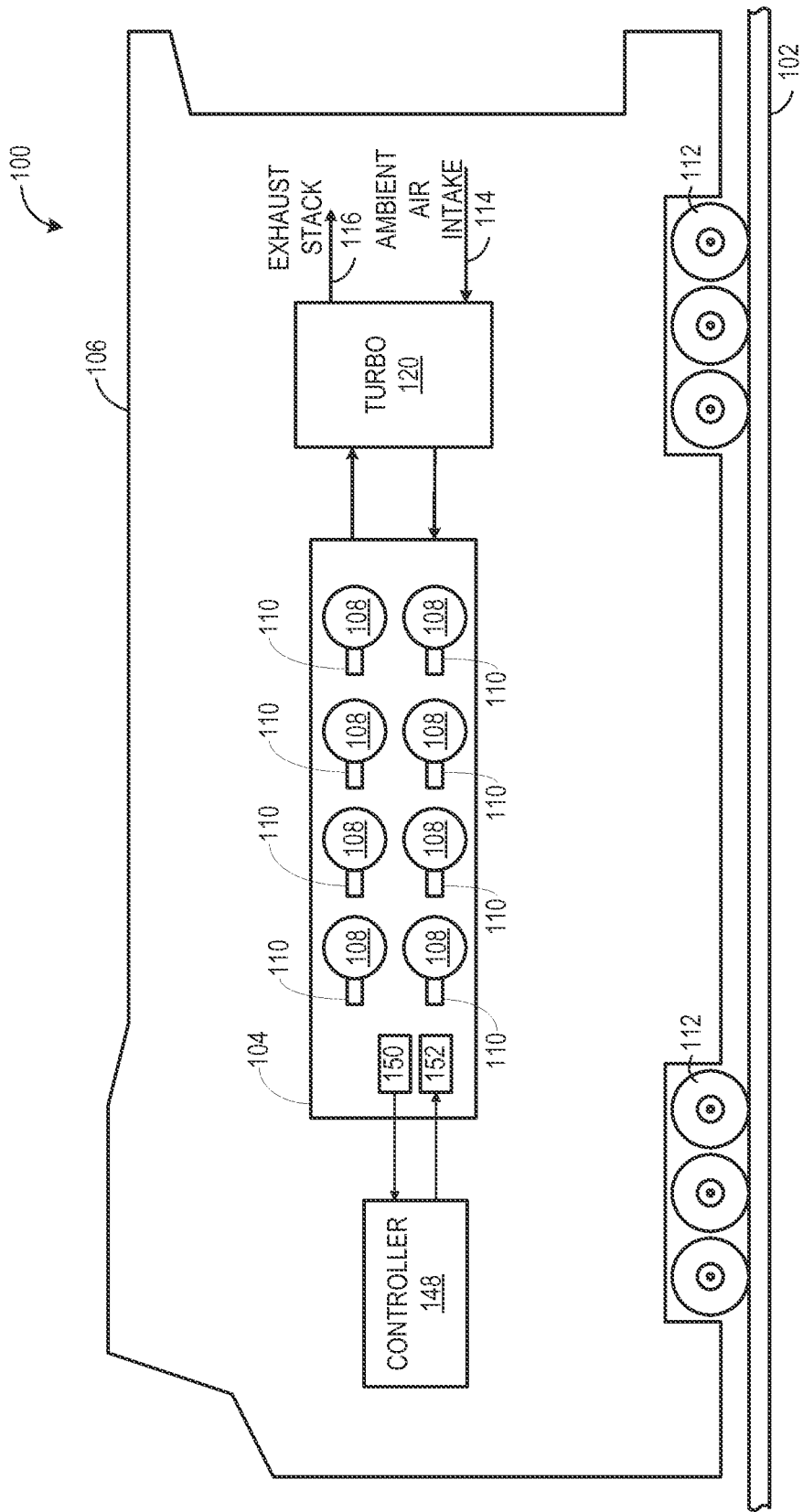
FIG. 1 shows a schematic diagram of a vehicle with an engine according to an embodiment of the disclosure.
Figure 2:
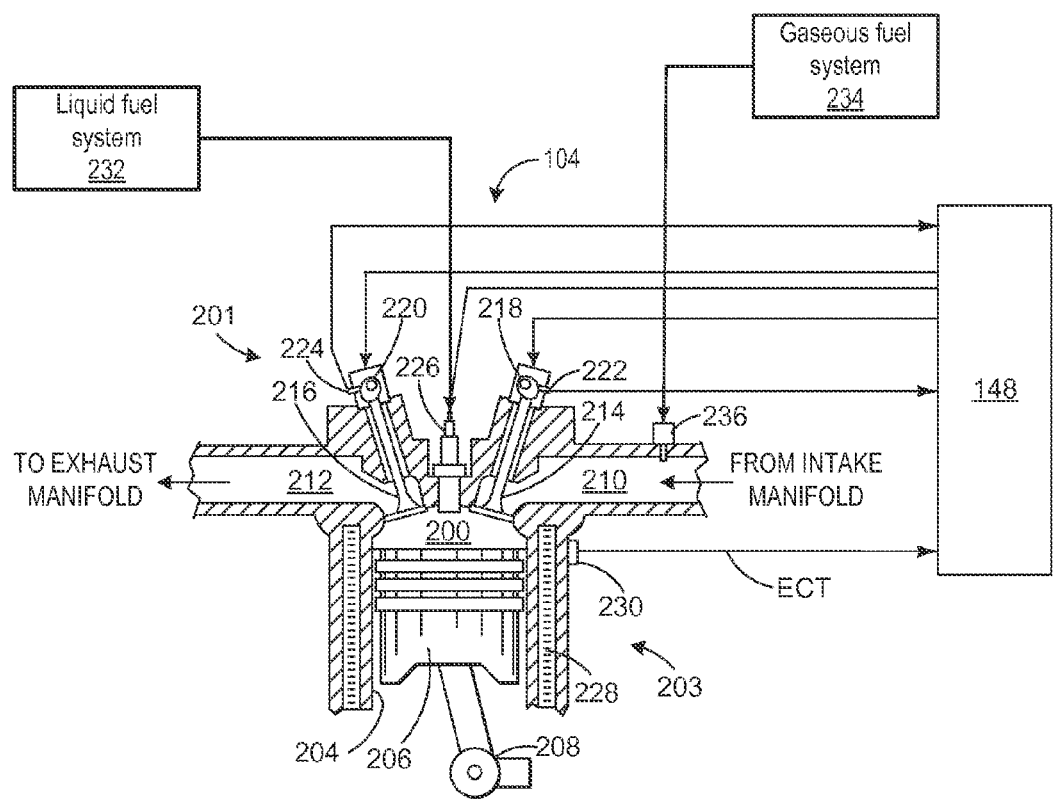
FIG. 2 shows a schematic diagram of an example cylinder of a multi-fuel engine according to an embodiment of the invention.
Figure 3:
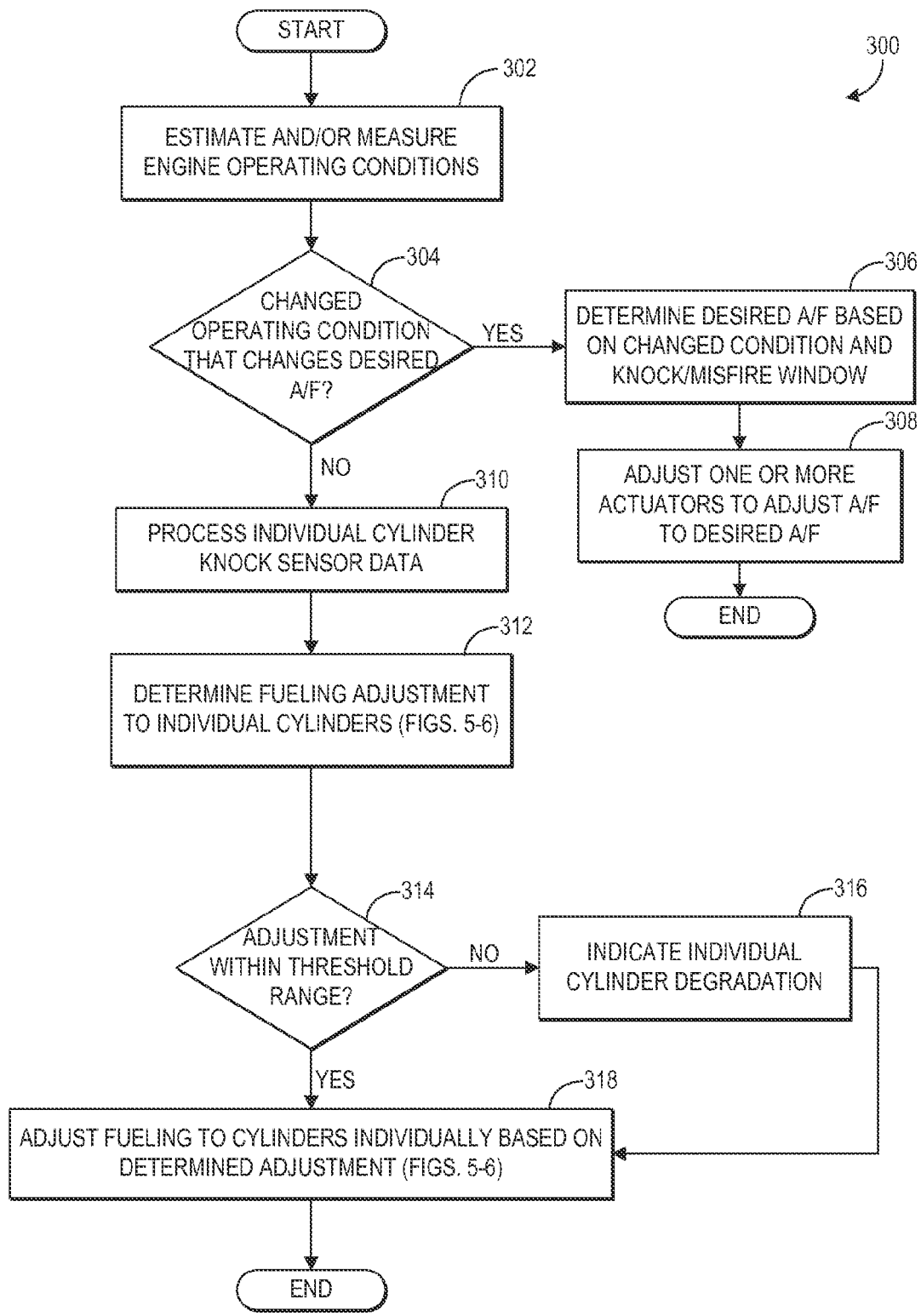
FIG. 3 shows a flow chart of a method for adjusting fueling to engine cylinders based on a desired oxygen-fuel ratio and knock sensor outputs according to an embodiment of the invention.
Figure 4:
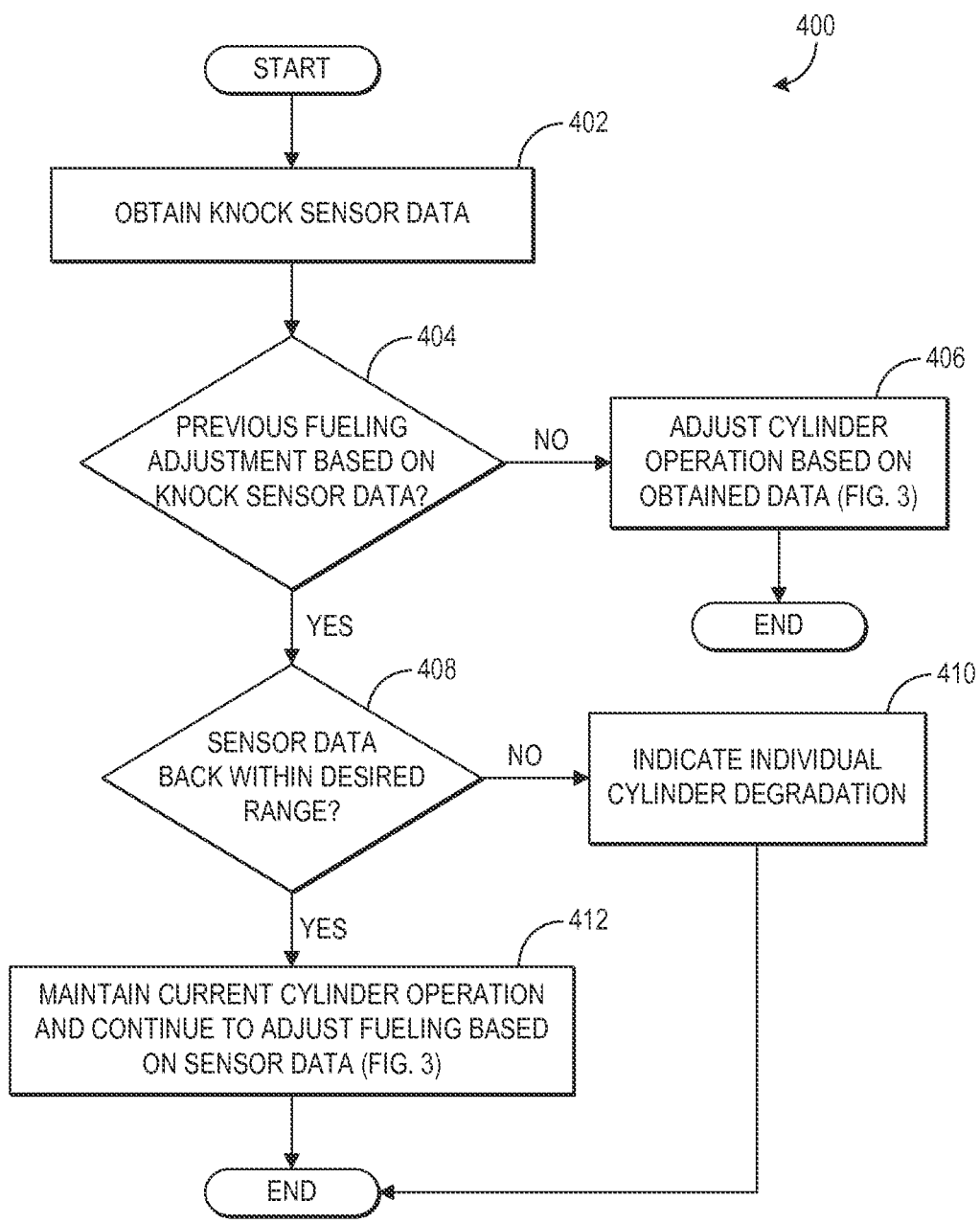
FIG. 4 shows a flow chart of a method for determining individual cylinder degradation based on knock sensor outputs of individual cylinders according to an embodiment of the invention.
Figure 5:
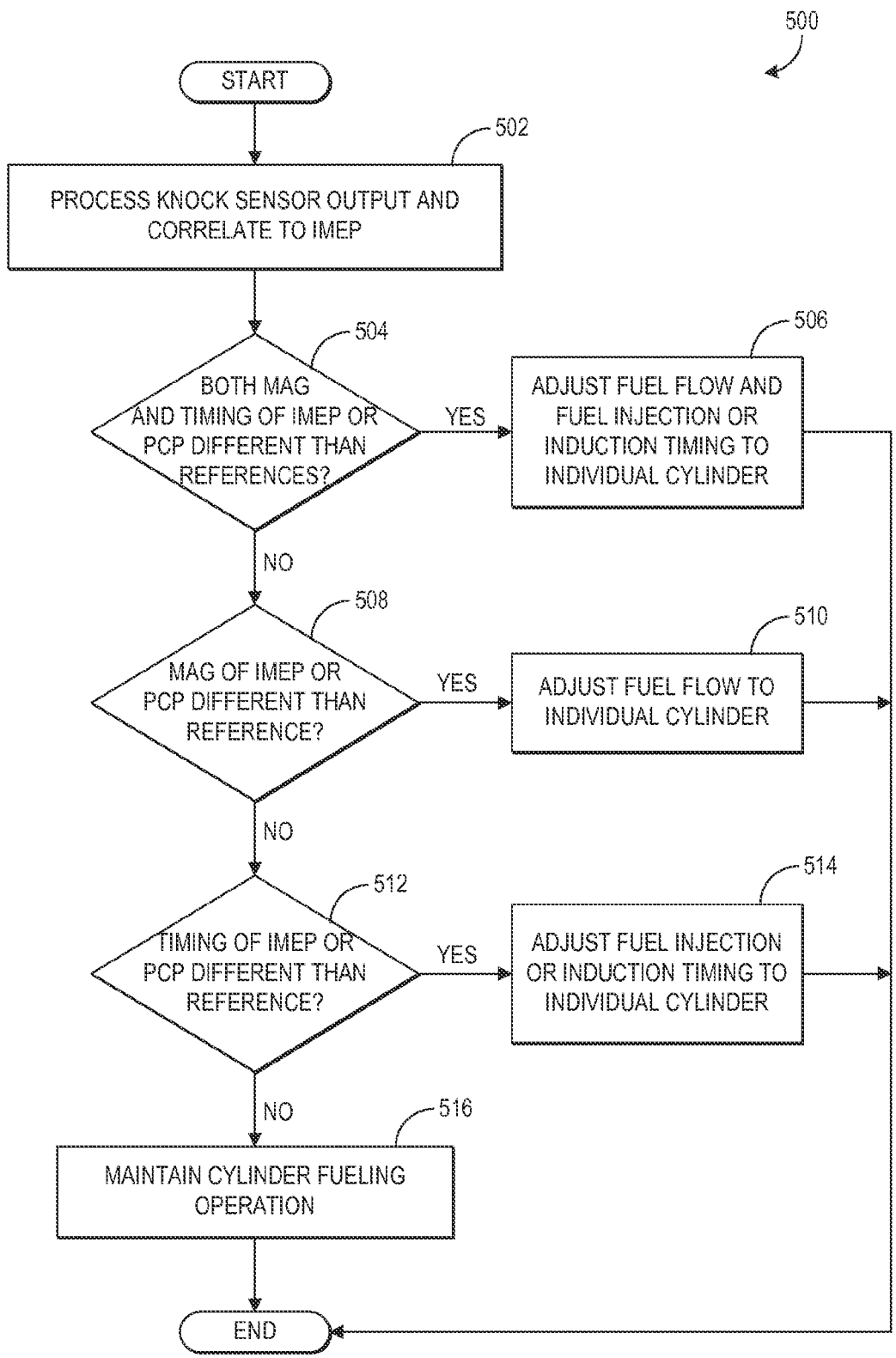
FIG. 5 shows a flow chart of a method for adjusting fuel flow and/or injection timing to an individual engine cylinder based on a magnitude and timing of a pressure value determined from a knock sensor output.
Figure 6:
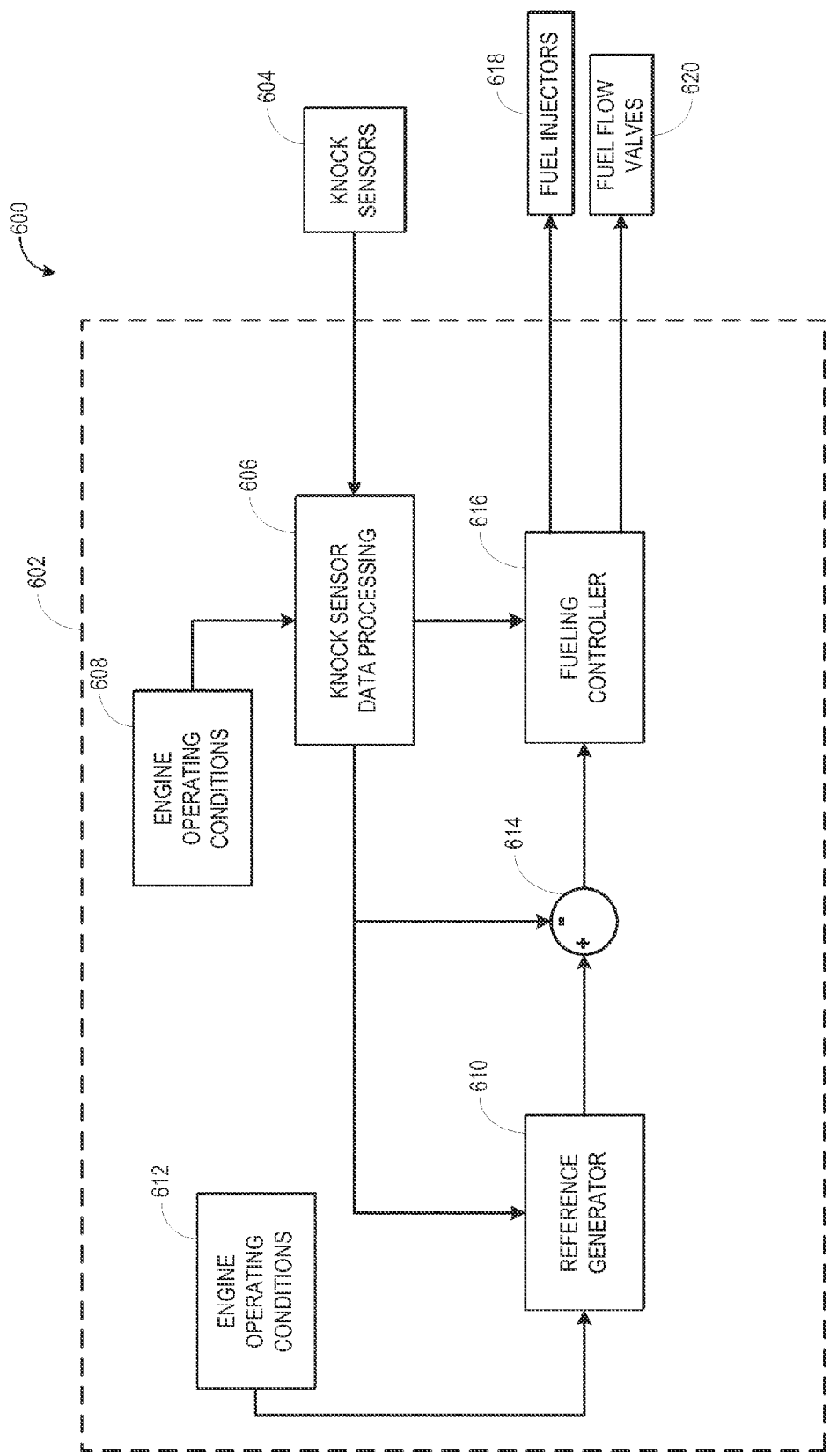
FIG. 6 shows a control system diagram for adjusting fueling to engine cylinders based on knock sensor outputs of individual cylinders according to an embodiment of the invention.

FIG. 1 shows an example of a vehicle in which an engine is installed, such as a rail vehicle. The engine may include a plurality of engine cylinders and a knock sensor for each cylinder (e.g., power assembly). An example of a single cylinder of the engine, which may combust two fuels, such as natural gas and diesel fuel, is shown in FIG. 2. An engine controller may receive an output from the plurality of knock sensors. As shown in FIG. 3, the controller may adjust fueling to engine cylinders based on a desired oxygen-fuel ratio (or air-fuel ratio, in another example) and the knock sensor outputs. As used herein, air-fuel ratio (e.g., A/F) and oxygen-fuel ratio may be interchangeable with one another. For example, the controller may determine a cylinder pressure value (such as indicated mean effective pressure or peak cylinder pressure) for each cylinder based on the knock sensor outputs (e.g., based on knock sensor outputs calibrated to cylinder pressure). The controller may then determine a fueling adjustment to individual engine cylinders based on the determined cylinder pressure values. An example of a control system diagram for adjusting fueling based on the determined cylinder pressure value is shown at FIG. 6. Additionally, the controller may determine a magnitude and timing of the cylinder pressure value for each cylinder and then adjust fuel flow to individual cylinders, fuel injection timing to individual cylinders, or both, based on the determined magnitude and timings, as shown at FIG. 5. In some embodiments, the controller may indicate individual cylinder degradation if fueling adjustments based on knock sensor outputs are not successful (e.g., do not move cylinder operation into a desired range), as shown by the method of FIG. 4. Cylinder outputs may be balanced by individually adjusting fueling as described above. As a result, engine efficiency may be increased while engine component degradation due to unbalanced cylinders may be decreased. Further, balancing cylinder power output in this way may increase fuel economy and the longevity of cylinder components, thereby decreasing engine costs (e.g., engine lifecycle costs).

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for adjusting operation of individual cylinders of an engine based on a knock sensor output, an example of a platform is disclosed in which the engine may be installed in a vehicle, such as a rail vehicle. FIG. 1 shows a block diagram of an embodiment of a vehicle system 100 (e.g., a locomotive system), herein depicted as vehicle 106. The illustrated vehicle is a rail vehicle configured to run on a rail 102 via a plurality of wheels 112. As depicted, the vehicle includes an engine system with an engine 104. In one embodiment herein, the engine is a multi-fuel engine operating with diesel fuel and natural gas, but in other examples the engine may use various combinations of fuels other than diesel and natural gas. In yet another embodiment, the engine may be a single-fuel engine operating with only one fuel, such as diesel fuel or gasoline or natural gas.

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The engine system includes a turbocharger 120 ("TURBO") that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown in FIG. 1) which is at least partially driven by a turbine (not shown in FIG. 1). While in this case a single turbocharger is shown, other systems may include multiple turbine and/or compressor stages. In other embodiments, the engine system may not include a turbocharger.

In some embodiments, the engine system may include an exhaust gas treatment system coupled in the exhaust passage upstream or downstream of the turbocharger. In one example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, NOx trap, as well as filters or other systems and devices.

A controller (e.g., electronic controller) 148 may be employed to control various components related to the vehicle system. In one example, the controller includes a computer control system. The controller further includes computer readable storage media (not shown) including code for enabling on-board monitoring and control of rail vehicle operation. The controller, while overseeing control and management of the vehicle system, may receive signals from a variety of sensors 150, as further elaborated herein, to determine operating parameters and operating conditions, and correspondingly adjust various engine actuators 152 to control operation of the vehicle. For example, the controller may receive signals from various engine sensors including, but not limited to, engine speed, engine load, boost pressure, exhaust pressure, ambient pressure, exhaust temperature, and the like. Correspondingly, the controller may control aspects and operations of the vehicle system by sending commands to various components such as traction motors, alternator, cylinder valves, throttle, and the like.

As shown in FIG. 1, the engine includes a plurality of cylinder 108. Though FIG. 1 depicts an engine with 8 cylinders, other numbers of cylinders are possible. Each cylinder of the engine includes a knock sensor 110. In this way, the engine includes one knock sensor for each cylinder. As such, each individual cylinder knock sensor may measure data associated with the cylinder it is coupled to. In one example, the knock sensor may be a strain gauge based or accelerometer based knock sensor. The knock sensor may output a voltage which is then received as a voltage signal at the controller. In one embodiment, as described in further detail below with reference to FIGS. 3-6, the controller processes the voltage signal from the knock sensor to determine a corresponding indicated mean effective pressure (IMEP) value for the individual cylinder which the knock sensor is coupled to. In another example, the controller may correlate the received knock sensor voltage to another cylinder pressure such as a peak cylinder pressure. Thus, the controller receives data from each knock sensor of each engine cylinder of the engine and processes the received data to indicate engine cylinder knock, determine the indicated IMEP or peak cylinder pressure, and subsequently adjust engine operation based on the received data. For example, as described further below with reference to FIGS. 3-6, the controller may adjust fueling to the engine cylinders based on the received data from the knock sensors.

FIG. 2 depicts an embodiment of a combustion chamber, or cylinder 200, of a multi-cylinder internal combustion engine, such as the engine described above with reference to FIG. 1. For example, the cylinder may be any one of the cylinders 108 shown in FIG. 1. The cylinder may be defined by a cylinder head 201, housing the intake and exhaust valves and liquid fuel injector, described below, and a cylinder block 203.

The engine may be controlled at least partially by a control system including controller 148 which may be in further communication with a vehicle system, such as the locomotive described above with reference to FIG. 1. As described above, the controller may further receive signals from various engine sensors including, but not limited to, engine speed, engine load, boost pressure, exhaust pressure, turbocharger speed, ambient pressure, $CO_2$ levels, exhaust temperature, NOx emission, engine coolant temperature (ECT) from temperature sensor 230 coupled to cooling sleeve 228, knock sensor data, etc. Correspondingly, the controller may control the vehicle system by sending commands to various components such as alternator, cylinder valves, throttle, fuel injectors, etc.

The cylinder (i.e., combustion chamber) may include cylinder liner 204 with a piston 206 positioned therein. The piston may be coupled to a crankshaft 208 so that reciprocating motion of the piston is translated into rotational motion of the crankshaft. The crankshaft may include a crankshaft speed sensor for outputting a speed (e.g., instantaneous speed) of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger in some embodiments (not shown in FIG. 2) and to atmosphere, via an exhaust manifold. The exhaust passage may further receive exhaust gases from other cylinders of the engine in addition to the cylinder, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head.

The intake valve may be controlled by the controller via an actuator 218. Similarly, the exhaust valve may be controlled by the controller via an actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 232, which may include a fuel tank, fuel pumps, and a fuel rail. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector. As explained further below, fueling to the cylinder may be controlled by the controller actuating the fuel injector based on turbocharger speed fluctuations.

Further, each cylinder of the engine may be configured to receive gaseous fuel (e.g., natural gas) alternative to or in addition to diesel fuel. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, etc., located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, opening time (in engine crank position or in engine crank degree) and/or duration of opening of the gas admission valve may be adjusted to regulate an amount of gaseous fuel provided to the cylinder. Adjusting the opening timing (e.g., when the gas admission valve is opened and closed) may be referred to herein as adjusting induction timing of gaseous fuel. As one example, the duration of gas admission (or gas valve) opening is defined by the engine crank degrees corresponding to opening and closing of the gas admission valve. Each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve opening time (in engine crank position in engine crank degree) and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc. In yet another embodiment, gaseous fuel from the gaseous fuel system may be directly injected into the engine cylinders. For example, each cylinder may include a direct fuel injector or gas admission valve (similar to valve 236) coupled directly to an engine cylinder. In this way, both diesel and gaseous fuel may be directly injected into individual engine cylinders (e.g., such as in a high pressure "dual-fuel" direct injection system). Additionally, in one embodiment, each engine cylinder may include a spark plug for igniting fuel, such as natural gas, at the engine cylinder. In another embodiment, each engine cylinder may include an alternate ignition device (other than a spark plug) for igniting fuel at the engine cylinder.

As introduced above, each cylinder of the engine may have a dedicated knock sensor. As such, the engine controller may receive a knock sensor output for each of the engine cylinders. The controller may then determine an indicated mean effective pressure (IMEP) value for each individual cylinder based on the corresponding knock sensor output. In another example, the controller may correlate the received knock sensor output to another cylinder pressure such as a peak cylinder pressure. The controller may then compare the IMEP, or other knock sensor based pressure value, of each cylinder to set knock thresholds (e.g., such as upper knock thresholds), misfire thresholds, and/or reference values (e.g., reference values based on expected or standard engine cylinder operating conditions). The controller may also correlate the IMEP values with an output of the crankshaft to determine a timing of the IMEP (which may be referred to herein as the 50% and/or 90% burn points of the cylinder) value or PCP. As such, the controller may compare the timing of the IMEP of each cylinder to a desired injection timing Based on the magnitude and/or timing of the IMEP values determined from the knock sensor of each cylinder, the controller may then adjust fueling (e.g., fuel flow) and/or injection timing to individual cylinders that are outside of threshold or desired ranges. Further, the controller may compare the determined IMEP values for each individual cylinder to all the IMEP values of the remaining cylinders to determine if the cylinders are balanced (e.g., determine if the output of each cylinder is balanced and within a threshold of the other cylinder outputs). If the engine cylinders are not balanced, engine efficiency may decrease and/or engine components may become degraded. Thus, the controller may then further adjust individual cylinder fueling based on the comparison of the IMEP values of the individual cylinders in order to balance the cylinder outputs of the cylinders. In this way, individually adjusting fueling to the engine cylinders based on individual knock sensor outputs may increase engine efficiency, increase fueling control in multi fuel engines, and reduce degradation of engine components due to cylinder imbalance.

Turning to FIG. 3, a method 300 for adjusting fueling to engine cylinders based on a desired oxygen-fuel ratio and knock sensor outputs is shown. Specifically, fueling to engine cylinders may be adjusted based on outputs from knock sensors on each cylinder being outside of threshold ranges, being outside of set or desired levels as indicated by engine operating conditions (such as oxygen-fuel ratio, injection timing, or the like), and/or being different than or unbalanced from other cylinders of the engine. Method 300 is executed by an engine controller (such as controller 148 shown in FIGS. 1-2) based on instructions stored thereon. As such, the controller executes method 300 and the other methods described herein (e.g., methods 400 and 500 of FIGS. 4 and 5, respectively) according to the instructions stored on a non-transitory memory of the controller in combination with the various sensors (e.g., knock sensors) and actuators (e.g., fuel injectors, fuel pumps, fueling valves, or the like) of the engine.

Method 300 begins at 302 by estimating and/or measuring engine operating conditions. Engine operating conditions may include engine speed, engine load (e.g., such as notch level), indications of engine knock, cylinder pressures (such as IMEP and/or peak cylinder pressure), MAF (mass air flow), MAP (intake manifold air pressure), MAT (intake manifold air temperature), boost level, substitution ratio of a first fuel (e.g., gaseous fuel such as natural gas) to a second fuel (e.g., diesel fuel), or the like.

At 304 the method includes determining if there is a changed operating condition that results in a change in a desired air-fuel ratio (or oxygen-fuel ratio) for injection into engine cylinders of the engine (e.g., for combustion). The changed operating condition may include one or more of a change in engine load (e.g., a change in engine load indicated by a change in notch level or pedal position), a wheel slip condition (e.g., as measured by a wheel spin detector of the vehicle), an indication of engine knock, and/or an indication of engine misfire. The changed operating condition may also include one or more of a change in a measured oxygen level in an exhaust passage of the engine, a change in the substitution ratio of natural gas injected into the engine, a change in intake manifold pressure, a change in ambient temperature or pressure, a change in exhaust emissions, a change in exhaust temperature, a change in peak cylinder pressure, and/or a change in the speed of the engine. As one example, the indications of engine knock and engine misfire may be indicated based on signals received from dedicated engine knock and misfire sensors of the engine. As another example, the indications of engine knock and engine misfire may be inferred based on alternate engine operating conditions. For example, conditions for engine knock and engine misfire, such as certain combinations of engine load, engine speed, and oxygen-fuel ratio, may be stored in a memory of the controller (e.g., in the form of one or more look-up tables). As such, based on a change in engine load and a current oxygen-fuel ratio being combusted by the engine cylinders, the controller may predict if engine misfire or engine knock are expected. The desired oxygen-fuel ratio determined at 304 may be an overall oxygen-fuel ratio for the engine (e.g., for all engine cylinders). Thus, the method at 304 may include checking for changed engine operating conditions that may result in unstable combustion of the engine as a whole if the oxygen-fuel ratio is not adjusted during and/or after the changed operating condition.

If there is a changed operating condition that changes the desired air-fuel ratio (or oxygen-fuel ratio) at 304, the method continues to 306 to determine the desired oxygen-fuel ratio based on the changed condition and a knock and misfire window of the engine. As defined herein, the knock and misfire window may be a range of oxygen-fuel ratios for the current engine operating conditions where engine knock and engine misfire may not occur. If engine operation is outside of this window, engine misfire or engine knock may occur (depending on which side of the window the engine is operating). For example, in a multi fuel engine (e.g., such as a dual fuel engine), higher oxygen-fuel ratios may lead to misfire while lower oxygen-fuel ratios may lead to knock. Therefore, by operating between knock and misfire thresholds (e.g., within the knock and misfire window), engine misfire and knock events may be reduced, thereby increasing engine efficiency. Thus, the controller may determine a new desired oxygen-fuel ratio for the new, changed operating conditions (e.g., the change in load or wheel slip) which may avoid or reduce the likelihood of engine misfire and knock. In this way, the desired oxygen-fuel ratio may be based on the changed operating condition and known knock and misfire data for a range of oxygen-fuel ratios and engine operating conditions which may be stored in the memory of the controller. Further, as explained above, the desired oxygen-fuel ratio may be an overall desired oxygen-fuel ratio for all cylinders of the engine. In another embodiment, the controller may determine a desired oxygen-fuel ratio for each engine cylinder.

At 308, the method includes adjusting one or more engine actuators to adjust the current oxygen-fuel ratio being combusted at the engine cylinders (e.g., prior to the changed operating condition) to the newly determined desired oxygen-fuel ratio. Adjusting the one or more engine actuators includes one or more of adjusting a speed of the engine (e.g., increasing engine speed to increase airflow to the engine cylinders), adjusting fuel flow to the engine (e.g., adjusting an amount of fuel injected into or upstream of the cylinders), or adjusting a position (e.g., an amount of opening) of a compressor recirculation valve (CRV), wastegate, or engine bypass valve (e.g., a valve arranged in a bypass passage coupled to an intake passage of the engine at a position upstream of the engine cylinders and downstream of the compressor). In the case of a multi fuel engine where the engine combusts two or more fuels, such as natural gas and diesel, adjusting the fuel flow may include adjusting the amount of natural gas flowing to the engine cylinders, adjusting the amount of diesel flowing (e.g., injected into) the engine cylinders, and/or adjusting a substitution ratio of fuel injected into the engine cylinders. It should be noted herein that the term substitution ratio is referred to as ratio of the quantity of plurality of fuels injected into the engine. For example, if diesel and natural gas are used, the substitution ratio is the ratio of quantity of natural gas to the total quantity of fuel (natural gas and diesel) supplied to the multi fuel engine. As such, adjusting the fuel flow may include adjusting actuators such as fuel injectors or fuel flow control valves (e.g., such as gas admission valve 236 shown in FIG. 2) coupled to the engine. The engine bypass valve may divert air away from the engine cylinders ant thus the engine bypass valve may be adjusted to increase or decrease the amount of airflow to the engine, thereby increasing or decreasing the oxygen-fuel ratio. After 308 the method ends. However, method 300 may start again and proceed to 310 and the rest of method 300 in order to fine tune the fueling for individual cylinders based on knock sensor data.

If there is not a changed operating condition at 304 that results in a change in the desired oxygen-fuel ratio, the method continues to 310 to obtain and process individual cylinder knock sensor data. As described above, a dedicated knock sensor (e.g., such as one of knock sensors 110) may be coupled to each engine cylinder. The controller receives the output from each knock sensor and then correlates it to certain operating parameters and compares the correlated data to reference, threshold, or other cylinder values. For example, each knock sensor may output a voltage value. The controller may then correlate the received voltage signal to an IMEP value, or another cylinder pressure value (such as peak cylinder pressure, PCP). The controller may also correlate the received sensor data to crankshaft angle (e.g., crank position) to determine the timing of the IMEP value (e.g., referred to herein as the 50% burn point of the associated cylinder) or PCP. As such, the timing of each IMEP or PCP value may be determined and related to a crankshaft angle. The magnitude and the timing (e.g. location) of the IMEP value in the crankshaft rotation may then be compared to those of other cylinders, expected/desired timings and values (e.g., based on standard engine models, such as a mean value engine model that determines a desired IMEP and timing for all cylinders of a standard, non-degraded engine), and/or threshold values (e.g., such as knock or misfire thresholds and/or peak cylinder pressure limits). Thus, in one example, the method may include determining an IMEP (or PCP) value and its corresponding magnitude and timing for each individual cylinder from the knock sensor outputs.

At 312, the controller determines a fueling adjustment for each individual cylinder based on the determined magnitude and timing of the IMEP or PCP value determined at 310. The fueling adjustment to each individual cylinder may include an adjustment to an amount of gaseous fuel delivered by a fuel flow control valve (e.g., gas admission valve) or gaseous fuel injector coupled to an individual cylinder (or coupled upstream of the individual cylinder), an adjustment to an amount of diesel fuel injected by a fuel injector coupled to the individual cylinder, and/or an adjustment to the fuel injection timing of the gaseous and/or diesel fuel injector. Additionally or alternatively, the fueling adjustment to each cylinder may include an adjustment to an induction timing of the gaseous fuel flow control valve (or an adjustment to a gas fuel injector and/or ignition device in a single fuel gasoline engine). Methods for determining the fueling adjustment for each individual cylinder are presented at FIGS. 5-6, as described further below.

In one embodiment, the method at 312 may include determining if the knock sensor data for each cylinder is outside of set thresholds. For example, the controller may determine if the IMEP (or PCP) for each cylinder is outside of a knock and/or misfire range (e.g., a range of pressures where knock, misfire, or unstable combustion may not occur) and/or at or above an upper threshold PCP (e.g., PCP limit). If the determined IMEP or PCP values are outside of the set thresholds, the method may include determining a fueling and/or injection timing adjustment to individual cylinders to adjust cylinder operation into a desired range (e.g., within knock, misfire, and/or PCP ranges for stable combustion).

In another embodiment, the method at 312 may include determining if the injection (and/or induction) timing of the individual cylinders is within a set range. The injection timing for each cylinder may be estimated based on a timing of the IMEP value (or PCP or other cylinder pressure value) determined from the knock sensor output correlated to the crankshaft angle. The controller then compares the estimated injection timing to a desired or set injection timing for the individual cylinder. The desired or set injection timing may be based on engine operating conditions. If the injection timing is not within the set or desired range, the method may include determining an adjustment to the diesel injection timing (or gas or alternate fuel injection timing if a different fuel is injected into the cylinders) of individual cylinders.

In yet another embodiment, the method at 312 may include determining if the engine cylinders are balanced. As introduced above, the cylinders being balanced refers to all cylinders of the engine having a similar output (e.g., within a threshold of one another). If the cylinders aren't balanced, additional stress may be put on engine components (such as the crankshaft, crankshaft bearings, and cylinder connecting rods), thereby resulting in degradation over time. As one example, the method at 312 may include comparing the IMEP value (or PCP value) determined from the knock sensor output of each cylinder to the IMEP values of all the remaining engine cylinders. Specifically, the controller may determine which cylinders have an IMEP value that is a threshold amount outside of a mean (or average) IMEP value for all the engine cylinders. If all the IMEP values for each of the cylinders are within a threshold range of one another, the cylinders may be relatively balanced and the controller may maintain individual cylinder operation (e.g., fueling and fuel injection timing) for the current desired oxygen-fuel ratio. Alternatively, if the cylinders are not balanced, the method may include determining a fueling adjustment (e.g., fuel flow rate and/or fuel injection timing) to cylinders individually based on the knock sensor data and a reference value. As one example, the reference value may be the mean or average IMEP value for all engine cylinders. As another example, the reference value may be a mean or average IMEP value for all engine cylinders of a standard or non-degraded engine, as based on an engine model (as described further below with reference to FIG. 6). As yet another example, the reference value may be based on calibration tests using in-cylinder pressure sensors. This data may be stored in a look-up table in a memory of the controller such that a desired in-cylinder pressure (or PCP or IMEP) for each cylinder under different engine operating conditions may be determined by the controller.

At 314, the controller decides if the determined adjustment to individual cylinder fueling is within a threshold range. In one example, the threshold range may be based on a calibrated adjustment threshold (e.g., limit) for the engine cylinder. For example, outside of the threshold range, the adjustments to the cylinder fueling may place cylinder operation outside of possible operating ranges or outside of knock/misfire thresholds of the engine. As the engine cylinder degrades further, it may take more fuel to generate the same power and thus the fueling adjustments may increase. In another example, the method at 314 may include determining if the determined PCP or IMEP value is within a threshold range, where the threshold range is a percentage above and below a nominal (e.g., baseline or reference value for a non-degraded cylinder) value of the PCP or IMEP. For example, the threshold range for the PCP may be +/−15% of a baseline or nominal PCP value for that cylinder. In another example, the threshold range for the IMEP may be +/−4% of a baseline or nominal IMEP value for that cylinder. If the determined fueling adjustments (or the determine PCP or IMEP values) are not within the respective threshold ranges, the method continues to 316 to indicate individual cylinder degradation. Indicating degradation may include one or more of signaling to a user, via a visual or audible indicator, that the individual cylinder is degraded and/or setting a diagnostic flag within the controller.

Alternatively at 314, if the determined fueling adjustment is within the threshold range, the method continues to 318 to adjust fueling to cylinders individually based on the determined fueling adjustment. Adjusting fueling (e.g., fuel flow) may include adjusting an amount of fuel flowing to the engine (e.g., via adjusting operation of a fuel injector coupled to the cylinder) or adjusting fuel injection timing of a fuel injector coupled to the cylinder. In the case of a multi fuel engine where the engine combusts two or more fuels, such as natural gas and diesel, adjusting the fueling may include adjusting the amount of natural gas flowing to the engine cylinder, adjusting the amount of diesel flowing (e.g., injected into) the engine cylinder, and/or adjusting a substitution ratio of fuel injected into the engine cylinders. As such, adjusting the fueling of each individual cylinder may include adjusting actuators such as fuel injectors or fuel flow control valves coupled to the corresponding cylinder. Adjusting injection timing may include adjusting a timing of injection of diesel fuel into the engine cylinder (e.g., referred to herein as adjusting diesel injection timing).

In one embodiment, the controller may adjust fueling (e.g., a gas flow rate of gaseous fuel or diesel flow rate) and/or injection or induction timing (e.g., of diesel and/or gaseous fuel) to individual cylinders based on set thresholds (e.g., knock and/or misfire thresholds), reference values, and IMEP values based on knock sensor outputs. One example method of adjusting fuel amount and injection timing to individual cylinders based on knock sensor data, reference values, and knock and/or misfire thresholds is shown at FIG. 6.

As introduced above, method 300 may also be carried out in a single-fuel engine, such as an engine combusting only natural gas or gasoline. In this embodiment, method 300 may include adjusting fueling to the individual cylinders, as described above, and/or adjusting ignition timing (e.g., such as spark timing) at each individual cylinder based on the knock sensors output of each individual cylinder (e.g., based on the determined PCP or IMEP values). For example, fine tuning of individual cylinder fueling based on the knock sensor output, knock threshold, misfire threshold, and/or reference value (e.g., for balancing engine cylinders) may be performed by adjusting ignition timing for igniting the gaseous fuel injected into or upstream of the individual engine cylinder. Ignition timing adjustments may take place in addition to or in place of the injection timing adjustments described above. As one example, in a gas-only engine with spark ignition, spark timing may be adjusted based on the knock sensor data, as described above. As another example, in a gas-only engine with another (e.g., non-spark plug) ignition device, ignition timing may be adjusted based on the knock sensor data. As yet another example, in a single-fuel direct-injection gasoline engine, injection timing may be adjusted based on the knock sensor data. As another example, in a single-fuel gasoline engine, ignition timing may be adjusted based on the knock sensor data.

Continuing to FIG. 4, a method 400 is shown for determining individual cylinder degradation based on knock sensor outputs of individual cylinders and previous fueling adjustments. Method 400 begins at 402 by obtaining knock sensor data. The method at 402 may be similar to the method presented at 310 in method 300, as described above. As such, the controller may determine an IMEP (or PCP) value based on the knock sensor output and a timing at which that pressure value occurs within the cylinder at 402. At 404, the method includes determining if there was a previous fueling adjustment based on knock sensor data. For example, the controller may determine if fueling to an individual cylinder was recently (e.g., the last fueling adjustment or a fueling adjustment within a threshold duration of time) adjusted based on knock sensor outputs. For example, during method 300 the controller may have adjusted an amount of fuel being injected into a first cylinder based on the IMEP value of the first cylinder being lower than other cylinders of the engine. If fueling to the individual cylinder has not been previously adjusted based on knock sensor output, the method continues to 406 to adjust cylinder operation based on the obtained knock sensor data, as described above with reference to method 300 in FIG. 3.

Alternatively, if the controller has recently adjusted fueling to one or more individual cylinders based on knock sensor output, the method continues to 408 to determine if the knock sensor data (e.g., determined IMEP value) is back within a desired range (e.g., the magnitude and/or timing of the IMEP is within a desired range based on threshold values, set values, or reference values). For example, the method at 408 may include determining if the previous fueling correction to the individual engine cylinder based on the knock sensor output was successful (e.g., moved individual cylinder operation back within desired ranges). If the IMEP value is not back within the desired range, the controller indicates individual cylinder degradation of the affected cylinder at 410. Indicating degradation may include one or more of signaling to a user, via a visual or audible indicator, that the individual cylinder is degraded or setting a diagnostic flag within the controller. The specific type of individual cylinder degradation (e.g., fuel injector or fuel valve degradation) may be determined based on which of the magnitude or timing of the IMEP value is outside of threshold ranges and has not been effectively corrected using the fueling adjustments. If instead the knock sensor data for the individual cylinder is back within desired ranges after making the fueling adjustments based on the previous knock sensor outputs, the method continues to 412 to maintain current cylinder operation and continue to adjust fueling based on knock sensor data, as shown at FIG. 3, without indicating cylinder degradation.

In an alternate embodiment, degradation of individual cylinder components may be determined based on how far the knock sensor output is outside of determined or desired ranges. For example, if the IMEP value of a first cylinder is outside of a first threshold range (e.g., based on baseline, nominal, expected, or desired values), the controller may not indicate degradation of the cylinder. However, if the IMEP value of the first cylinder is outside of a second threshold range, which is greater than the first threshold range, the controller may indicate cylinder degradation. As one example, the second threshold range may be based on limits or thresholds for unstable engine combustion. Thus, the further the determined IMEP value of an individual cylinder gets outside of desired ranges, the more likely it is that the cylinder is degraded and needs to be serviced or replaced. However, by first adjusting fueling to individual cylinders responsive to a smaller threshold range of desired IMEP values, the controller may extend the life or use of a cylinder or cylinder components, thereby increasing engine efficiency while also reducing engine operating cost and engine component costs. Then, when the fueling adjustments no longer work (e.g., no longer move the cylinder into a relatively efficient operating range), the controller may indicate to a vehicle operator that it is time to replace the cylinder or one or more components coupled to the cylinder.

FIG. 5 shows a method 500 for adjusting fuel flow and/or injection timing to an individual engine cylinder based on a magnitude and timing of an in-cylinder pressure value determined from a knock sensor output. Method 500 may continue from/be part of the methods at 312 and 318 presented in FIG. 3. Further, method 500 may be executed for each cylinder and corresponding knock sensor of the engine. In this way, individual cylinder operation may be assessed and individual cylinder fueling may then be adjusted.

Method 500 begins at 502 by obtaining and processing data (e.g., outputs) from a knock sensor coupled to an individual cylinder and correlating the received data to a pressure value of the individual cylinder, such as IMEP or PCP. The method at 502 may be similar to the method presented at 310 of FIG. 3. As such, method 502 may include determining a magnitude and timing of the IMEP (e.g., 50% burn point) or PCP value for the individual cylinder. As explained above, the timing of the IMEP or PCP value may be determined by correlating the crankshaft angle to the time the IMEP or PCP occurs within the individual cylinder.

At 504, the method includes determining if both the magnitude and timing of the IMEP (or PCP) value are different than corresponding reference values. The magnitude and timing of the IMEP or PCP value being different than corresponding reference values may include the magnitude and timing being a threshold amount different than corresponding reference values. As introduced above, the reference magnitude of the IMEP value may be based on either an average of the IMEP values for all the engine cylinders or an average for all engine cylinders of a model (e.g., standard non-degraded) engine according to an engine model stored within a memory of the controller (e.g., a mean value engine model of the engine). As such, the reference magnitude may be based on knock sensor data for all the sensors and/or engine operating conditions (e.g., engine load, engine speed) of the engine. The reference timing of the IMEP (or PCP) may be based on an expected timing from the engine model (e.g., mean value engine model). One method for determining whether the magnitude and/or timing of the IMEP or PCP value for an individual cylinder is different than a reference value is shown at FIG. 6, as described further below.

If both the magnitude and timing of the IMEP (or PCP) value are different than the corresponding references values, the method continues to 506 to adjust fuel flow and fuel injection or induction timing to the individual cylinder. For example, in a dual fuel engine combusting diesel and gaseous fuel, the method at 506 may include adjusting one or more of a fuel flow of diesel fuel (e.g., via activating an actuator to adjust a diesel fuel injector of the individual cylinder) or a fuel flow of gaseous fuel (e.g., via activating an actuator to adjust a gaseous fuel valve coupled to or upstream of the individual cylinder), and one or more of gaseous fuel injection or induction timing or diesel fuel injection timing (e.g., via activating an actuator to adjust the diesel fuel injector of the individual cylinder) in response to both the magnitude and timing of the IMEP (or PCP) being different than the corresponding reference values. For example, the method at 506 may include adjusting timing of a gas admission valve that admits gas either to an inlet passage of an individual cylinder (e.g., upstream of the cylinder) or directly into the individual cylinder. Adjusting the fuel flow of diesel fuel or gaseous fuel may include increasing or decreasing an amount of diesel or gaseous fuel, respectively, delivered to a corresponding cylinder. For example if the magnitude of the IMEP is less than the magnitude of the IMEP reference value, the controller may increase the amount of fuel delivered to the corresponding engine cylinder. Alternatively, if both the magnitude and timing of the IMEP or PCP value are not different than their corresponding reference values, the method continues to 508.

At 508 the method includes determining if only the magnitude of the IMEP (or PCP) value is different than the reference magnitude of the IMEP. If only the magnitude of the IMEP is different than the reference, the method continues to 510 to adjust fuel flow to the individual cylinder. For example, if the IMEP value is greater than the reference, the method at 508 may include decreasing the amount of fuel injected into the individual cylinder. As explained above, in the dual fuel (or multi fuel) engine, adjusting fuel flow may include adjusting a flow of diesel fuel and/or gaseous fuel to the individual cylinder. In another example, adjusting fuel flow may include adjusting a substitution ratio of gaseous fuel to total fuel of the individual cylinder. During a first condition the controller may adjust the flow of diesel fuel to the individual cylinder and during a different, second condition the controller may adjust the flow of gaseous fuel to the individual cylinder. The first condition may include if the gas flow is not able to be adjusted (due to gas substitution ratio thresholds). The second condition may include if the engine is knocking (e.g., if engine knock conditions are present) and/or if an upper threshold (e.g., limit) of the gas substitution rate has not been reached (e.g., gas flow is able to be increased further if the PCP or IMEP are still below the targets or reference values). In one example, the method at 510 (and also 506 if fuel flow is being adjusted) may include first adjusting gas flow (e.g., increasing or decreasing the amount of gas injected into or upstream of the engine cylinder) and then, if there is still a difference between the determined magnitude of the IMEP or PCP and the reference IMEP or PCP, adjusting diesel flow if the gas flow cannot be further adjusted (due to gas substitution ratio limits or knock/misfire limits of the engine. Since cylinder to cylinder variation of diesel injection (e.g., the amount of diesel injected into each cylinder) is less than the cylinder to cylinder variation of gas injection (e.g., the amount of gaseous fuel delivered to or injected into each cylinder), first adjusting gaseous fuel flow to the indicated cylinder may result in more efficient balancing of the cylinders. Variability of diesel fuel injection between individual cylinders may be particularly lower than gaseous fuel flow between individual cylinders in a system where gaseous fuel is injected in an intake port or outside of a cylinder combustion chamber. Thus, cylinder to cylinder gas variation may be the dominant reason for IMEP or PCP variation between engine cylinders.

If the magnitude of the IMEP value is not different than the reference magnitude, the method proceeds to 512 to determine if only the timing of the IMEP or PCP value is different than the reference timing of the IMEP or PCP. If only the timing of the IMEP or PCP for the individual cylinder is different than the reference, the method continues to 514 to adjust fuel injection or induction timing to the individual cylinder. Adjusting fuel injection timing may include adjusting fuel injection timing of diesel fuel and/or fuel induction timing (e.g., if gaseous fuel is port-injected upstream of the cylinder) or injection timing (e.g., if gaseous fuel is direct injected via a fuel injector to the cylinder) of gaseous fuel in a multi fuel engine (e.g., advancing or retarding timing). For example, adjusting fuel induction timing may include adjusting timing of a gas admission valve that admits gas (e.g., gaseous fuel) either to an inlet passage of an individual cylinder (e.g., upstream of the cylinder) and adjusting fuel injection timing may include adjusting the timing of gaseous fuel directly injected into the individual cylinder via a fuel injector. Alternately, if the timing is not different than the reference timing, the method proceeds to 516 to maintain cylinder fueling operation (e.g., not adjust fuel flow or fuel injection timing of the individual cylinder).

In an another embodiment, the methods at 506, 510, and/or 514 may additionally or alternatively include adjusting ignition timing of the direct-injected or port-injected gaseous fuel via actuating a spark plug or alternate ignition device coupled with each cylinder. In this way, the ignition timing of the gaseous fuel may be adjusted based on each of the output of the individual knock sensor for each cylinder, the knock threshold for current engine operating conditions, and the reference value of individual cylinder output.

In an alternate embodiment, if the engine is a single-fuel engine, method 500 may include adjusting fuel flow and/or fuel injection or induction timing of a single fuel, as described above with reference to the methods at 506, 510, and 514. For example, if the engine is a single-fuel gasoline engine, adjusting fueling and/or induction or injection timing at 506, 510, and/or 514 may include adjusting injection timing of gasoline (if the engine is a direct-injection gasoline engine) and/or adjusting ignition timing of the injected gasoline (e.g., via either a spark plug or alternate ignition device). In another example, if the engine is a single-fuel natural gas engine, adjusting fueling and/or induction or injection timing at 506, 510, and/or 514 may include adjusting induction timing of the gaseous fuel in a port injected gas-only engine and adjusting injection timing of the gaseous fuel in a high pressure direct injection engine.

Turning to FIG. 6, a control system diagram 600 and method for adjusting fueling (e.g., fuel flow amount, ratio of fuels in multi fuel engine, and/or injection or induction timing) to engine cylinders based on knock sensor outputs of individual cylinders is shown. The control system diagram includes controls executed within an engine controller 600 (such as the controller 148 shown in FIGS. 1-2). The controller 600 receives data outputs from a plurality of knock sensors 604 (such as knock sensors 110 shown in FIG. 1). As discussed above, each cylinder of the multi-cylinder engine includes a dedicated knock sensor 604. The controller receives the outputs from each of the knock sensors 604 at 606 where the knock sensor data is processed. As explained above with reference to the method at 310 in FIG. 3, the controller may receive a voltage signal from each knock sensor and then correlate this to a peak cylinder pressure (PCP) and/or an indicated mean effective pressure (IMEP). The controller also assesses additional engine operating conditions 608 at 606. The additional engine operating conditions 608 may include a crankshaft speed (measured by a crankshaft speed sensor), a manifold air pressure (MAP), a manifold air temperature (MAT), and/or an injection timing of one or more fuel injectors (e.g., such as diesel fuel injectors). The timing at which the PCP or IMEP (e.g., 50% burn point within the corresponding cylinder) occurs is determined at 606 by correlating the crankshaft position (e.g., angle) to when the PCP or IMEP occurs for each cylinder. Thus, at 606 the controller determines a magnitude and timing of the PCP and/or IMEP for each cylinder.

The controller feeds the determined PCP or IMEP values for each cylinder to a reference generator 610. The reference generator 610 determines a reference cylinder pressure (e.g., PCP or IMEP) value based on engine operating conditions 612 which may include knock sensor outputs, engine power output, engine speed, and/or the like. As one example, the reference generator 610 may determine a reference magnitude and reference timing of the PCP and/or IMEP for an individual cylinder based on an average (e.g., mean) value of the PCP or IMEP for all cylinders of the operating engine. As another example, the reference generator 610 may determine the reference magnitude and reference timing of the PCP and/or IMEP for an individual cylinder based on the engine operating conditions 612 input into an engine model of a standard, non-degraded engine (e.g., a mean value engine model, MVEM). For example, for the current engine operating conditions at 612, the controller determines a mean (e.g., average) value of the magnitude and timing of the PCP or IMEP for all cylinders in the engine model. A difference between the mean values of the magnitude and timing references values and the determined magnitude and timing IMEP or PCP values for each cylinder of the operating engine is determined at 614. The resulting difference is then fed to a fueling controller 616 of the controller 600. As one example, the fueling controller 616 may be a PID controller with limiters. For example, the fueling controller 616 may determine one or more of a diesel and gaseous fuel quantity adjustment to each cylinder based on the difference in magnitude between the reference IMEP (determined at 610) and the estimated IMEP (e.g., estimated based on knock sensor data at 606) for each cylinder. The determined fuel quantity adjustments may be modified and/or further determined based on knock and misfire limits of the engine cylinder (e.g., such as a knock threshold and/or misfire threshold). For example, after receiving the knock sensor outputs at 606, the controller may feed knock and misfire indices (e.g., thresholds or threshold ranges where knock or misfire may occur when operating outside of the thresholds or threshold ranges) to the fueling controller 616. Thus, the fuel flow or quantity adjustment determined for each cylinder is based on the difference between the estimated and desired (e.g., reference) IMEP while maintaining the adjustment within knock and misfire limits for the cylinder. The controller then actuates one or more fuel injectors (e.g. diesel fuel injectors) 618 or fuel flow valves 620 (e.g., gaseous fuel flow valves) coupled to individual engine cylinders to inject the desired amount of diesel and/or gaseous fuel based on the determined adjustments at 616. The fueling controller 616 further determines an adjustment or correction to the fuel injection timing of the fuel injectors 618 and/or fuel induction timing of the fuel flow valves 620 based on a difference between the reference and estimated timings of the IMEP (or PCP) for each cylinder and then actuates the fuel injectors 618 to inject fuel at the corrected timing. Adjustments may be made to each individual cylinder (and corresponding fuel flow valve(s) and fuel injector(s)) based on the corresponding estimate IMEP (or PCP) for that cylinder and the reference values. The adjustments to individual cylinder fueling may be further adjusted at 616 to maintain a demanded total fuel energy for a demanded torque output. In this way, engine performance may be maintained while balancing engine cylinder outputs and thereby increasing engine efficiency.

In this way, fueling to individual engine cylinders may be adjusted based on outputs of individual knock sensors for each cylinder. The fueling adjustments may be further based on a knock threshold (and/or a misfire threshold) for the current engine operating conditions and a reference value of the cylinder. As one example, an engine controller may determine a PCP and/or IMEP from the received knock sensor output and determine a magnitude and timing of the PCP and/or IMEP for each cylinder. These determined cylinder pressure values are then compared to a reference value for the magnitude and/or timing of the PCP and IMEP of the individual cylinder. The controller may then determine a fueling adjustment to each cylinder based on a difference between the estimated and reference IMEP or PCP values. The fueling adjustment may be further based on knock thresholds for each cylinder, thereby maintaining individual cylinder operation within knock threshold ranges. The reference values for the PCP and/or IMEP may be based on an engine model that averages values for all cylinders in a model engine or an average value of the estimated IMEP and/or PCP values for all cylinders of the engine in which the cylinders are installed. Adjusting fueling to individual cylinders may include adjusting one or more of a gaseous fuel flow amount, a diesel fuel flow amount, an injection or induction timing of gaseous fuel, and/or an injection timing of diesel fuel injectors. The technical effect of individually adjusting, for each cylinder, fueling to the cylinder is balancing cylinder outputs of the engine cylinders while maintaining cylinder operation within knock limits of the engine. As a result, engine knock may be reduced while increasing the efficiency of the engine. Further, by balancing the output of the engine cylinders, degradation to engine components, such as a crankshaft, crankshaft bearings, and/or connecting rods and/or connecting rod bearings between the crankshaft and pistons in cylinders, may be reduced and the longevity of individual cylinder components may be increased.

As one embodiment, a method for a multi-fuel engine comprises: individually adjusting, for each cylinder of the engine, one or more of a gas flow of gaseous fuel, a diesel flow of diesel fuel, and injection or induction timing of gaseous fuel, and/or an injection timing of diesel fuel based on each of an output of an individual knock sensor for each cylinder, a knock threshold for current engine operating conditions, and an individual cylinder reference value. The method may further comprise determining a cylinder pressure value from the output of the individual knock sensor for each cylinder. As one example, the determined cylinder pressure value includes one or more of an indicated mean effective pressure (IMEP) or a peak cylinder pressure. In another example, the method may further comprise determining a magnitude and timing of the cylinder pressure value, where determining the timing includes correlating a position of a crankshaft of the engine to a time at which the determined cylinder pressure value occurs. In one example, the method may further comprise adjusting one or more of the gas flow of gaseous fuel or the diesel flow of diesel fuel in response to the determined magnitude of the cylinder pressure value being different than a magnitude reference. In another example, the method further comprises adjusting the injection timing of diesel fuel or the injection or induction timing of gaseous fuel in response to the determined timing of the cylinder pressure being different than a timing reference.

The method may further comprise individually adjusting, for each cylinder, one or more of the gas flow of gaseous fuel, the diesel flow of diesel fuel, the injection or induction timing of gaseous fuel, or the injection timing of diesel fuel in response to a difference between the individual cylinder reference value and the determined cylinder pressure value. As one example, the individually adjusting one or more of the gas flow of gaseous fuel, the diesel flow of diesel fuel, the injection or induction timing of gaseous fuel, or the injection timing of diesel fuel is further based on the knock threshold, where the knock threshold is based on the output of the individual knock sensor for each cylinder. In one example, the individual cylinder reference value is a mean cylinder pressure value of all cylinders in an engine model of a standard, non-degraded engine, where the mean cylinder pressure value is based on current engine operating conditions of the engine. In another example, the individual cylinder reference value is based on a mean value of the determined cylinder pressure for all cylinders of the engine. In yet another example, the engine combusts diesel fuel and natural gas and the method further comprises adjusting one or more of a substitution ratio of natural gas to total fuel or an ignition timing of the gaseous fuel (e.g., the ignition timing of the gaseous fuel injected into or upstream of the individual cylinder) based on each of the output of the individual knock sensor for each cylinder, the knock threshold for current engine operating conditions, and the reference value of individual cylinder output. Further, in one example, individually adjusting one or more of the gas flow of gaseous fuel, the diesel flow of diesel fuel, the injection or induction timing of gaseous fuel, or the injection timing of diesel fuel includes balancing outputs of all cylinders of the engine while maintaining a demanded torque output of the engine.

As another embodiment, a method for a multi fuel engine comprises based on an output of an individual knock sensor coupled to an individual cylinder of a plurality of engine cylinders of the engine, a knock limit, and a cylinder pressure reference value for the plurality of engine cylinders: during a first condition, adjusting one or more of diesel fuel injection timing or gaseous fuel injection or induction timing to the individual cylinder; during a second condition, adjusting one or more of an amount of diesel fuel or gaseous fuel injected into the individual cylinder; and during a third condition, adjusting both one or more of the diesel fuel injection timing or the gaseous fuel injection or induction timing and one or more of the amount of diesel fuel or gaseous fuel injected into the individual cylinder. The method may further comprise, during the second condition, first adjusting the amount of gaseous fuel injected into the one or more cylinders and second, adjusting the amount of diesel fuel injected into the one or more cylinders in response to a gas substitution rate threshold being reached where the amount of gaseous fuel can no longer be adjusted. Additionally or alternatively, the method may further comprise determining a magnitude and timing of a cylinder pressure of the individual cylinder based on the output of the individual knock sensor, where the cylinder pressure is one of a peak cylinder pressure or indicated mean effective pressure. As one example, the first condition includes when only the determined timing of the cylinder pressure differs from a timing of the cylinder pressure reference value. As another example, the second condition includes when only the determined magnitude of the cylinder pressure differs from a magnitude of the cylinder pressure reference value. As yet another example, the third condition includes when both the determined timing and magnitude of the cylinder pressure differs from the timing and magnitude of the cylinder pressure reference value, respectively.

As yet another embodiment, a multi fuel engine, comprises: a plurality of cylinders; a respective knock sensor coupled to each cylinder of the plurality of cylinders; and a controller having a non-transitory memory with computer-readable instructions for: for each cylinder of the plurality of cylinders, adjusting one or more of a flow of gaseous fuel, a flow of diesel fuel, an injection or induction timing of gaseous fuel, or an injection timing of diesel fuel into each cylinder based on each of an output of the knock sensor coupled to a corresponding cylinder, a knock threshold for current engine operating conditions, and a reference mean value of an individual cylinder pressure. In one example, an amount of adjusting one or more of the flow of gaseous fuel, the flow of diesel fuel, the injection or induction timing of gaseous fuel, or the injection timing of diesel fuel into each cylinder is based on a difference between the reference mean value of the individual cylinder pressure and an individual cylinder pressure determined from the output of the knock sensor.

As another embodiment, a method for a single-fuel engine combusting a single fuel comprises: individually adjusting, for each cylinder of the engine, one or more of a flow (or amount) of the single fuel, an injection or induction timing of the single fuel, and/or an ignition timing of the single fuel based on each of an output of an individual knock sensor for each cylinder, a knock threshold for current engine operating conditions, and an individual cylinder reference value. The method may further comprise determining a cylinder pressure value from the output of the individual knock sensor for each cylinder. As one example, the determined cylinder pressure value includes one or more of an indicated mean effective pressure (IMEP) or a peak cylinder pressure (PCP). In another example, the method may further comprise determining a magnitude and timing of the cylinder pressure value, where determining the timing includes correlating a position of a crankshaft of the engine to a time at which the determined cylinder pressure value occurs. In one example, the method may further comprise adjusting one or more of the flow of the single fuel in response to the determined magnitude of the cylinder pressure value being different than a magnitude reference. In another example, the method further comprises adjusting the injection timing of the single fuel in response to the determined timing of the cylinder pressure being different than a timing reference.

The method may further comprise individually adjusting, for each cylinder, one or more of the flow (or amount) of the single fuel, the injection or induction timing of the single fuel, and/or the ignition timing of the single fuel in response to a difference between the individual cylinder reference value and the determined cylinder pressure value. As one example, the individually adjusting one or more of the flow (or amount) of the single fuel, the injection or induction timing of the single fuel, and/or the ignition timing of the single fuel is further based on the knock threshold, where the knock threshold is based on the output of the individual knock sensor for each cylinder. In one example, the individual cylinder reference value is a mean cylinder pressure value of all cylinders in an engine model of a standard, non-degraded engine, where the mean cylinder pressure value is based on current engine operating conditions of the engine. In another example, the individual cylinder reference value is based on a mean value of the determined cylinder pressure for all cylinders of the engine. Further, in one example, individually adjusting one or more of the flow (or amount) of the single fuel, the injection or induction timing of the single fuel, and/or the ignition timing of the single fuel includes balancing outputs of all cylinders of the engine while maintaining a demanded torque output of the engine. In one example, the single fuel is gasoline. In another example, the single fuel is natural gas. In yet another example, the single fuel is diesel fuel.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for a multi-fuel engine, comprising:
   individually adjusting, for each cylinder of the engine, one or more of a gas flow of gaseous fuel, a diesel flow of diesel fuel, an injection or induction timing of gaseous fuel, and/or an injection timing of diesel fuel based on each of an output of an individual knock sensor for each cylinder, a knock threshold for current engine operating conditions, and an individual cylinder reference value.

2. The method of claim 1, further comprising, for each cylinder, determining a cylinder pressure value from the output of the individual knock sensor for each cylinder.

3. The method of claim 2, wherein the determined cylinder pressure value includes one or more of an indicated mean effective pressure (IMEP) or a peak cylinder pressure.

4. The method of claim 3, further comprising determining a magnitude and timing of the cylinder pressure value, where determining the timing includes correlating a position of a crankshaft of the engine to a time at which the determined cylinder pressure value occurs.

5. The method of claim 4, further comprising adjusting one or more of the gas flow of gaseous fuel or the diesel flow of diesel fuel in response to the determined magnitude of the cylinder pressure value being different than a magnitude reference.

6. The method of claim 4, further comprising adjusting one or more of the injection timing of diesel fuel or the induction or injection timing of gaseous fuel in response to the determined timing of the cylinder pressure being different than a timing reference.

7. The method of claim 2, further comprising individually adjusting, for each cylinder, one or more of the gas flow of gaseous fuel, the diesel flow of diesel fuel, the injection or induction timing of gaseous fuel, or the injection timing of diesel fuel in response to a difference between the individual cylinder reference value and the determined cylinder pressure value.

8. The method of claim 7, wherein the individually adjusting one or more of the gas flow of gaseous fuel, the diesel flow of diesel fuel, the injection or induction timing of gaseous fuel, or the injection timing of diesel fuel is further based on the knock threshold, where the knock threshold is based on the output of the individual knock sensor for each cylinder.

9. The method of claim 2, wherein the individual cylinder reference value is a mean cylinder pressure value of all cylinders in an engine model of a standard, non-degraded engine, where the mean cylinder pressure value is based on current engine operating conditions of the engine.

10. The method of claim 2, wherein the individual cylinder reference value is based on a mean value of the determined cylinder pressure for all cylinders of the engine.

11. The method of claim 1, wherein the engine combusts diesel fuel and natural gas and further comprising adjusting one or more of a substitution ratio of natural gas to total fuel or an ignition timing of gaseous fuel based on each of the output of the individual knock sensor for each cylinder, the knock threshold for current engine operating conditions, and the reference value of individual cylinder output.

12. The method of claim 1, wherein individually adjusting one or more of the gas flow of gaseous fuel, the diesel flow of diesel fuel, the injection or induction timing of gaseous fuel, or the injection timing of diesel fuel includes balancing outputs of all cylinders of the engine while maintaining a demanded torque output of the engine.

13. A method for a multi fuel engine, comprising:
   based on an output of an individual knock sensor coupled to an individual cylinder of a plurality of engine cylinders of the engine, a knock limit, and a cylinder pressure reference value for the plurality of engine cylinders:
   during a first condition, adjusting one or more of diesel fuel injection timing or gaseous fuel injection or induction timing to the individual cylinder;
   during a second condition, adjusting one or more of an amount of diesel fuel or gaseous fuel injected into the individual cylinder; and
   during a third condition, adjusting both one or more of the diesel fuel injection timing or the gaseous fuel injection or induction timing and one or more of the amount of diesel fuel or gaseous fuel injected into the individual cylinder.

14. The method of claim 13, further comprising, during the second condition, first adjusting the amount of gaseous fuel injected into the one or more cylinders and second, adjusting the amount of diesel fuel injected into the one or more cylinders in response to a gas substitution rate threshold being reached where the amount of gaseous fuel can no longer be adjusted.

15. The method of claim 13, further comprising determining a magnitude and timing of a cylinder pressure of the individual cylinder based on the output of the individual knock sensor, where the cylinder pressure is one of a peak cylinder pressure or indicated mean effective pressure.

16. The method of claim 15, wherein the first condition includes when only the determined timing of the cylinder pressure differs from a timing of the cylinder pressure reference value.

17. The method of claim 15, wherein the second condition includes when only the determined magnitude of the cylinder pressure differs from a magnitude of the cylinder pressure reference value.

18. The method of claim 15, wherein the third condition includes when both the determined timing and magnitude of the cylinder pressure differs from the timing and magnitude of the cylinder pressure reference value, respectively.

19. A multi fuel engine, comprising:
   a plurality of cylinders;
   a respective knock sensor coupled to each cylinder of the plurality of cylinders; and
   a controller having a non-transitory memory with computer-readable instructions for:
   for each cylinder of the plurality of cylinders, adjusting one or more of a flow of gaseous fuel, a flow of diesel fuel, an injection or induction timing of gaseous fuel, or an injection timing of diesel fuel into each cylinder based on each of an output of the knock sensor coupled to a corresponding cylinder, a knock threshold for current engine operating conditions, and a reference mean value of an individual cylinder pressure.

20. The multi fuel engine of claim 19, wherein an amount of adjusting one or more of the flow of gaseous fuel, the flow of diesel fuel, the injection or induction timing of gaseous fuel, or the injection timing of diesel fuel into each cylinder is based on a difference between the reference mean value of the individual cylinder pressure and an individual cylinder pressure determined from the output of the knock sensor.

\* \* \* \* \*